(12) United States Patent
Ma et al.

(10) Patent No.: US 11,788,473 B2
(45) Date of Patent: Oct. 17, 2023

(54) ADAPTIVE BOOSTING ALGORITHM-BASED TURBOFAN ENGINE DIRECT DATA-DRIVEN CONTROL METHOD

(71) Applicant: DALIAN UNIVERSITY OF TECHNOLOGY, Liaoning (CN)

(72) Inventors: Yanhua Ma, Liaoning (CN); Nan Ding, Liaoning (CN); Ximing Sun, Liaoning (CN); Xudong Zhao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 597 days.

(21) Appl. No.: 17/052,756

(22) PCT Filed: Mar. 19, 2020

(86) PCT No.: PCT/CN2020/080158
§ 371 (c)(1),
(2) Date: Nov. 3, 2020

(87) PCT Pub. No.: WO2021/139004
PCT Pub. Date: Jul. 15, 2021

(65) Prior Publication Data
US 2021/0348567 A1    Nov. 11, 2021

(30) Foreign Application Priority Data
Jan. 7, 2020 (CN) .......................... 202010013151.6

(51) Int. Cl.
*G06F 17/12*    (2006.01)
*F02C 9/00*    (2006.01)
(Continued)

(52) U.S. Cl.
CPC .............. *F02C 9/00* (2013.01); *G06F 18/214* (2023.01); *G06F 18/2411* (2023.01);
(Continued)

(58) Field of Classification Search
CPC ......... G06F 17/12; G06F 17/15; G05B 13/04; G01M 15/00
See application file for complete search history.

(56) References Cited

U.S. PATENT DOCUMENTS 11,580,441 B2 * 2/2023 Ding ...................... G06N 20/00
2015/0345403 A1 12/2015 Cai

FOREIGN PATENT DOCUMENTS

| CN | 102411305 A | 4/2012 |
| CN | 108375474 A | 8/2018 |
| CN | 110348079 A | 10/2019 |

* cited by examiner

*Primary Examiner* — Tan Q Nguyen
(74) *Attorney, Agent, or Firm* — Muncy, Geissler, Olds & Lowe, P.C.

(57) ABSTRACT

The present invention belongs to the technical field of control of aero-engines, and proposes an adaptive boosting algorithm-based turbofan engine direct data-driven control method. First, a turbofan engine controller is designed based on the Least Squares Support Vector Machine (LSSVM) algorithm, and further, the weight of a training sample is changed by an adaptive boosting algorithm so as to construct a turbofan engine direct data-driven controller combining a plurality of basic learners into strong learners. Compared with the previous solution only adopting LS SVM, the present invention enhances the control precision, improves the generalization ability of the algorithm, and effectively solves the problem of sparsity of samples by the adaptive boosting method. By the adaptive boosting algorithm-based turbofan engine direct data-driven control method designed by the present invention.

1 Claim, 6 Drawing Sheets

(51) Int. Cl.
G06N 20/10 (2019.01)
G06F 18/214 (2023.01)
G06F 18/2411 (2023.01)

(52) U.S. Cl.
CPC .......... *G06N 20/10* (2019.01); *F05D 2200/11* (2013.01); *F05D 2200/12* (2013.01); *F05D 2200/13* (2013.01); *F05D 2200/14* (2013.01); *F05D 2200/24* (2013.01); *F05D 2270/02* (2013.01); *F05D 2270/304* (2013.01); *F05D 2270/3061* (2013.01); *F05D 2270/44* (2013.01); *F05D 2270/71* (2013.01); *F05D 2270/803* (2013.01)

ADAPTIVE BOOSTING ALGORITHM-BASED TURBOFAN ENGINE DIRECT DATA-DRIVEN CONTROL METHOD

TECHNICAL FIELD

The present invention belongs to the technical field of control of aero-engines, and particularly relates to an adaptive boosting algorithm-based turbofan engine direct data-driven control method.

BACKGROUND

Turbine fan engine is called turbofan engine for short, and widely used in military and civilian fields due to the advantages of high propulsion efficiency and low fuel consumption. As the brain of the turbofan engine, a control system is a key component that directly determines the safety and performance thereof. The turbofan engine is a complex strong nonlinear system, so how to effectively control the turbofan engine becomes a difficult problem. The traditional turbofan engine control system adopts a control method that combines the PID control algorithm and MIN/MAX switching, and the method has conservativeness, small performance improvement and slow dynamic response. At the same time, with the emergence of emerging control theories and the verification and application in other fields, how to use advanced control methods to improve the conservativeness brought by the traditional control of turbofan engines and to improve the safety and performance of turbofan engines has important application significance.

The existing literature shows that the turbofan engine control method is mainly divided into a model-based method and a data-driven method. First, in the model-based control method, if the dynamic behavior of a control object is specified, a controller can be designed accordingly to make the control object meet the control requirements. For such a complex thermodynamic system as a turbofan engine, it is difficult to achieve an ideal model with precise parameters. Therefore, it is difficult to achieve the optimal performance of the turbofan engine. Second is the data-driven control method, which can design the controller by directly using a controlled system or the data input and output on line or off line instead of analyzing and using the mathematical model of the control object and also can achieve the control objectives. Therefore, compared with the model-based control method, the data-based turbofan aero-engine control gets rid of the dependence on the precise model, and solves the problem of realizing effective control on the turbofan engine when the precise mathematical model of the turbofan engine is not established or the mechanism model is difficult to establish. However, the data-driven algorithm has the following problems: 1. the generalization ability of a single model is weak, and such complex nonlinear system as the turbofan engine cannot be fully controlled under different working conditions within the range of a full envelope; and 2. as the test data of the turbofan engines is relatively less, the problem of sparsity of data samples is prone to occur, which reduces the precision and generalization ability of the data-driven model. Therefore, for the above problems, it is of great significance to design a turbofan engine direct data-driven control method that can solve the problems of weak generalization ability and sparsity of samples.

SUMMARY

In view of the problems of the existing turbofan engine control method, the present invention proposes an adaptive boosting algorithm-based turbofan engine direct data-driven control method. First, a turbofan engine controller is designed based on the Least Squares Support Vector Machine (LSSVM) algorithm, and further, the weight of a training sample is changed by an adaptive boosting algorithm so as to construct a turbofan engine direct data-driven controller combining a plurality of basic learners into strong learners. Compared with the previous solution only adopting LSSVM, the present invention enhances the control precision, improves the generalization ability of the algorithm, and effectively solves the problem of sparsity of samples by the adaptive boosting method.

The technical solution of the present invention is as follows:

An adaptive boosting algorithm-based turbofan engine direct data-driven control method, comprises the following steps:

Step 1: establishing a data set for the design of a turbofan engine direct data-driven controller Step 1.1: collecting control signals during the operation of the turbofan engine, including input fuel flow $w_f(n)$ of turbofan engine, corrected relative rotary speed $n_{1cor}(n)$ of low-pressure rotor, and corrected relative rotary speed $n_{2cor}(n)$ of high-pressure rotor, wherein $n=1, 2, \ldots$, indicating the $n^{th}$ sampling period;

Step 1.2: $\Delta u$ represents the input of turbofan engine, $\Delta y$ represents the output of turbofan engine, $\Delta n_{1cor}(n)$ and $\Delta n_{2cor}(n)$ respectively represent the variations of corrected relative rotary speeds of low-pressure rotor and high-pressure rotor of the turbofan engine, and $\Delta w_f(n)$ represents the variation of the input fuel flow of turbofan engine, defining $$\Delta u = [\Delta w_f(1), \Delta w_f(2), \ldots, \Delta w_f(n)]^T$$

$$\Delta y = [\Delta n_{2cor}(1), \Delta n_{2cor}(2), \ldots, \Delta n_{2cor}(n)]^T$$

$[\Delta u, \Delta y]$ is the original data set for the design of the turbofan engine direct data-driven controller;

Step 1.3: using the corrected relative rotary speed $n_{2cor}$ of high-pressure rotor as a scheduling parameter p (with the dimension equal to 1), and converting the scheduling parameter p to be within $[-1,1]$, as shown in the following formula:

$$p = \frac{2n_{2cor} - (n_{2cor\_max} + n_{2cor\_min})}{(n_{2cor\_max} - n_{2cor\_min})}$$

wherein $n_{2cor\_max}$ and $n_{2cor\_min}$ are respectively the upper limit and lower limit of the relative rotary speed $n_{2cor}$ of high-pressure rotor of the turbofan engine;

Step 2: adopting the methods of mean substitution and analysis of the Box-plot to perform data cleaning on the data in the data set $[\Delta u, \Delta y]$, and filling missing data and eliminating outlier data in the data set;

Step 3: adopting the LS SVM algorithm to design the turbofan engine controller

Step 3.1: adopting the random sampling method to use 80% of the data set as a training data set and 20% as a testing data set;

Step 3.2: adopting the Gauss kernel function $\Omega = K(p,t,k)$ to map the training data set to a high-dimensional feature space with the dimension of z from the original space so as to realize the linear regression of the training data set in the z-dimensional feature space, wherein the kernel function is expressed as follows:

$$\Omega = K(p, t, k) = \exp\left(-\frac{\|p(t)-p(k)\|_2^2}{2\sigma^2}\right)$$

wherein t and k respectively represent the time t and the time k, p(t) and p(k) represent the scheduling parameters of the time t and the time k, σ is the initial hyper-parameter radial basis width of the Gauss kernel function, and σ>0 is required;

Step 3.3: establishing the optimization problem of LSSVM:

$$\min_{\omega,b,e} J(\omega, e) = \frac{1}{2}\omega^T\omega + \frac{1}{2}\gamma\sum_{i=1}^{N} e_i^2$$

$$\text{s.t. } y_i[\omega^T\varphi(x_i) + b] = 1 - e_i$$

wherein ω is the normal vector of a hyperplane, the hyper-parameter γ is the weight (with the dimension equal to 1) for balancing "computation power for finding an optimal hyperplane" and "minimum deviation between training set and testing set", $y_i$ is the dependent variable after the control signals are given, e is the training error, b is the bias operator, and N is the number of samples in the training data set;

Step 3.4: using the Gaussian kernel function in step 3.2 and solving the optimization problem in step 3.3 to obtain the LSSVM regression function, which is expressed as follows:

$$y_{lssvm} = \sum_{k=1}^{N} \alpha_k K(p, t, k) + b$$

wherein $y_{lssvm}$ is the output of the turbofan engine controller designed based on the LSSVM algorithm, a is the Lagrangian operator, b is the bias operator, and N is the number of samples in the training data set;

Step 4: using the adaptive boosting method and the output of the turbofan engine controller designed based on the LSSVM algorithm established in step 3 to construct an adaptive boosting algorithm-based turbofan engine direct data-driven controller, and adjusting the parameters of the controller Step 4.1: the training data set is T=[Δu',Δy'], and [Δu',Δy'] is the turbofan engine control data set obtained after data cleaning, wherein Δu' is a control signal, Δy' is the measured value $\Delta n_{2cor}$ of high-pressure rotor variation, and the basic learners in the adaptive boosting algorithm adopt the turbofan engine controller designed based on the LSSVM algorithm constructed in step 3 to give the initial hyper-parameter radial basis width σ and the weight γ and set epoch as the iteration number of the basic learners;

Step 4.2: initializing the weight of the training data set to D (1)=($w_{11}$, $w_{12}$, ..., $w_{1N}$), $w_{1i}$=1/N, i=1, 2, ..., N, where w is the weight of each sample in the training data set;

Step 4.3: for the iteration number k=1, 2, ..., epoch, using the training data set of the weight D(k) for training to obtain the basic learner $G_{k(x)}$, and calculating the maximum error $E_k$ predicted by the basic learner on the training data set, which is expressed as follows:

$$E_k = \max|y_i - G_{k(x_i)}|, i=1,2,\ldots,N$$

Step 4.4: calculating the relative error of each data sample in the training data set, and adopting a linear error, a square error or an exponential error, which are respectively expressed as follows:

$$\text{Linear error: } e_{ki} = \frac{|y_i - G_{k(x_i)}|}{E_k};$$

$$\text{Square error: } e_{ki} = \frac{(y_i - G_{k(X_i)})^2}{E_k^2};$$

$$\text{Exponential error: } e_{ki} = 1 - \exp\left(-\frac{y_i - G_{k(x_i)}}{E_k}\right);$$

Step 4.5: calculating the regression error rate $e_{regression}$, as shown in the following formula:

$$e_{regression} = \sum_{i=1}^{N} w_{ki} e_{ki}$$

wherein $w_{ki}$ is the weight of the data sample in the training data set obtained from the last iteration, and $e_{ki}$ is the relative error obtained in step 4.4;

Step 4.6: calculating the weight coefficient $weight_k$ of the basic learner, as shown in the following formula:

$$weight_k = \frac{e_{regression}}{1 - e_{regression}}$$

Step 4.7: updating the sample weight distribution of the training data set, and adaptively adjusting the initial hyper-parameter radial basis width a according to the regression error rate, which is expressed as follows:

$$w_{k+1i} = \frac{w_{ki}}{Z_k} weight_k^{1-e_{ki}}$$

$$\sigma_k = \sigma_{k-1} - 0.8 * \exp(-(weight_k - weight_{k-1}))$$

wherein $w_{ki}$ is the weight coefficient of the $i^{th}$ data sample at the $k^{th}$ iteration, $\sigma_k$ is the hyper-parameter σ at the $k^{th}$ iteration, and $Z_k = \Sigma_{i-1}^N w_{ki} \cdot weight_k^{1-e_{ki}}$ is the normalized operator;

Step 4.8: averaging the predictive values $y_c$ generated by all iterations to obtain the final strong learner output $y_{final}$, which is expressed as follows:

$$y_{final} = \frac{1}{epoch} \sum_{c=1}^{epoch} y_c$$

Step 5: using the cross validation method to determine the initial hyper-parameter radial basis width σ and the weight γ to satisfy the validation error of less than 0.1%, maintaining the condition of σ,γ>ζ at all times during the iteration, wherein ζ is a smaller number not less than 0, if not in line, discarding the initial value, and selecting larger radial basis width σ and weight γ as the initial values of iteration to complete the design of the adaptive boosting algorithm-based turbofan engine direct data-driven controller.

The present invention has the following beneficial effects: by the adaptive boosting algorithm-based turbofan engine direct data-driven control method designed by the present invention.

DETAILED DESCRIPTION

The embodiments of the present invention will be further described in detail below in combination with the drawings and the technical solution.

Figure 1:
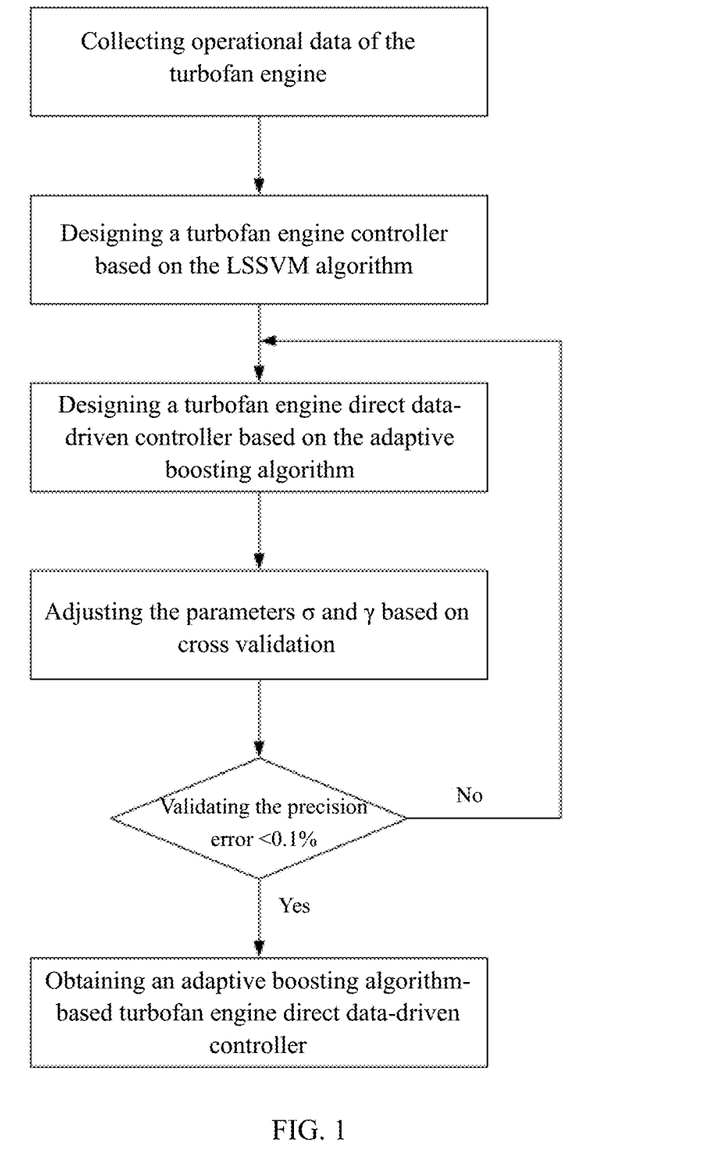
FIG. 1 is a flow chart of a control method of the present invention.

The flow chart of the control method of the present invention is shown in FIG. 1, and comprises the following specific steps:

Step 1: establishing a data set for the design of a turbofan engine direct data-driven controller.

Step 1.1: collecting control signals during the operation of the turbofan engine, including input fuel flow $w_f(n)$ of turbofan engine, corrected relative rotary speed $n_{1cor}(n)$ of low-pressure rotor, and corrected relative rotary speed $n_{2cor}(n)$ of high-pressure rotor, wherein n=1, 2, . . . , indicating the $n^{th}$ sampling period;

Step 1.2: $\Delta u$ represents the input of turbofan engine, $\Delta y$ represents the output of turbofan engine, $\Delta n_{1cor}(n)$ and $\Delta n_{2cor}(n)$ respectively represent the variations of corrected relative rotary speeds of low-pressure rotor and high-pressure rotor of the turbofan engine, and $\Delta w_f(n)$ represents the variation of the input fuel flow of turbofan engine, defining $$\Delta u=[\Delta w_f(1), \Delta w_f(2), \ldots, \Delta w_f(n)]^T$$

$$\Delta y=[\Delta n_{2cor}(1), \Delta n_{2cor}(2), \ldots, \Delta n_{2cor}(n)]^T$$

Figure 2:
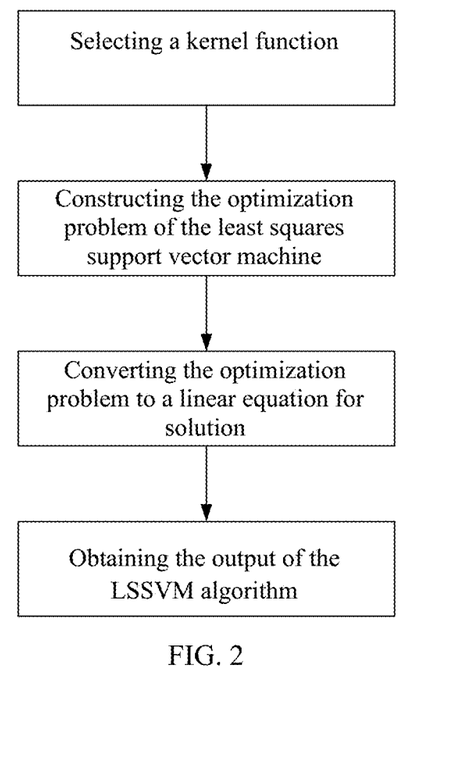
FIG. 2 is a flow chart of a least squares support vector machine algorithm adopted by the present invention.
Figure 3:
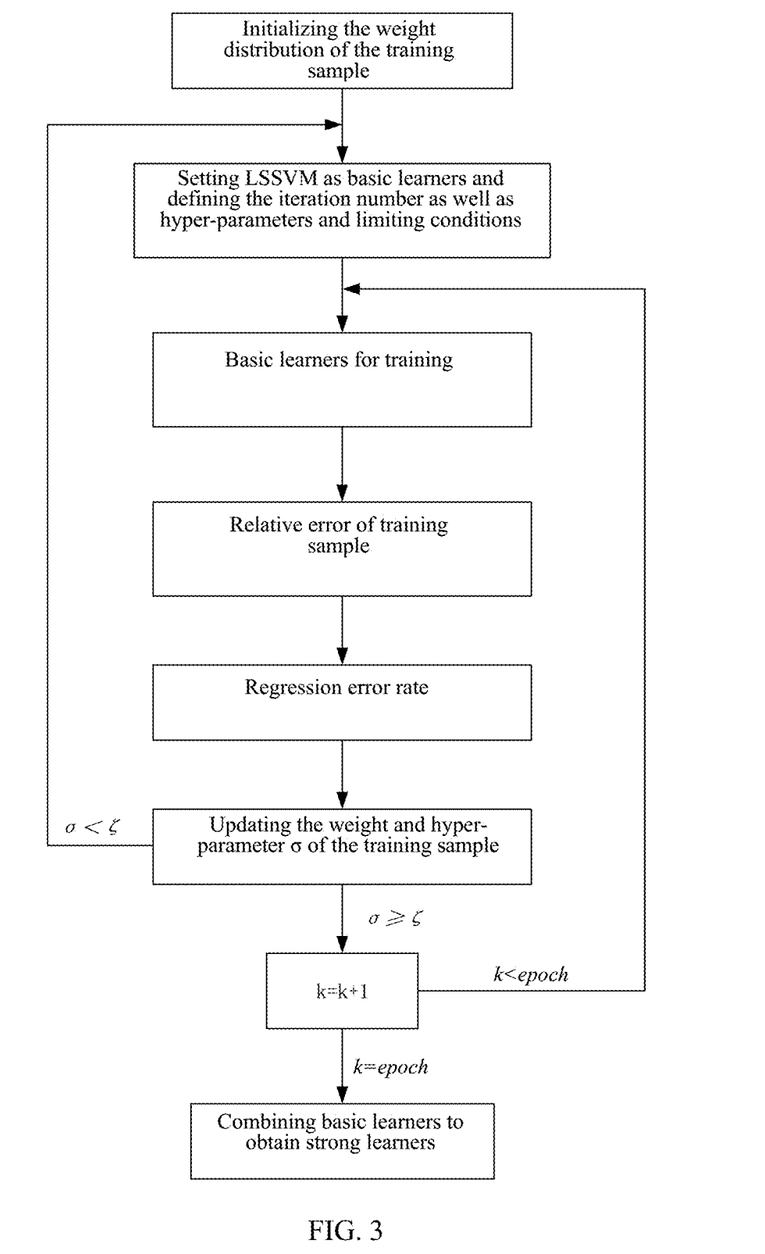
FIG. 3 is a flow chart of an adaptive boosting algorithm adopted by the present invention.
Figure 4:
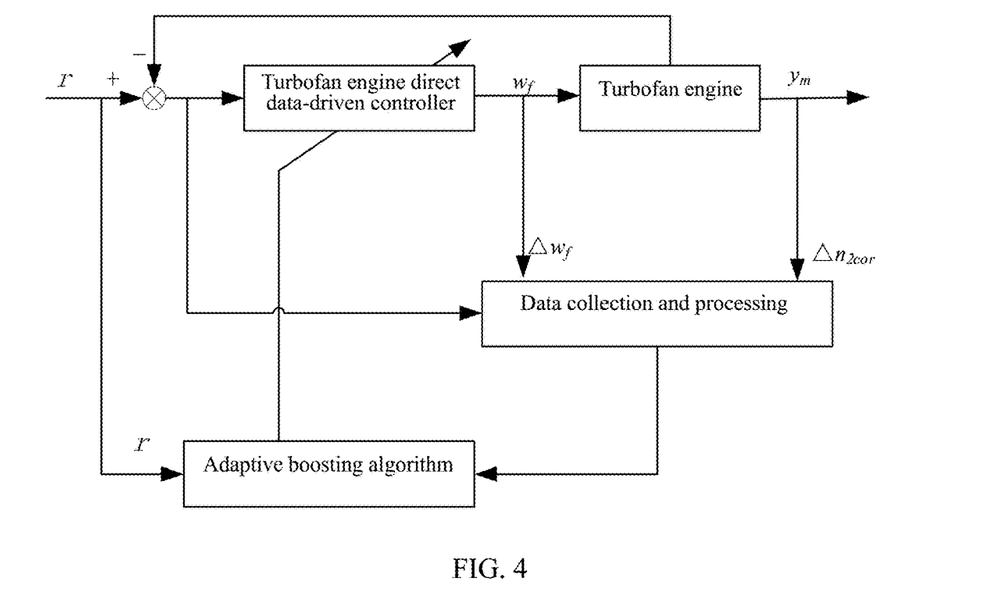
FIG. 4 is a structural block diagram of an adaptive boosting algorithm-based turbofan engine direct data-driven controller.

$[\Delta u, \Delta y]$ is the original data set for the design of the turbofan engine direct data-driven controller;

Step 1.3: using the corrected relative rotary speed $n_{2cor}$ of high-pressure rotor as a scheduling parameter p (with the dimension equal to 1), and converting the scheduling parameter p to be within [−1,1], as shown in the following formula $$p = \frac{2n_{2cor} - (n_{2cor\_max} + n_{2cor\_min})}{(n_{2cor\_max} - n_{2cor\_min})}$$

wherein $n_{2cor\_max}$ and $n_{2cor\_min}$ are respectively the upper limit and lower limit of the relative rotary speed $n_{2cor}$ of high-pressure rotor of the turbofan engine;

Step 2: adopting the methods of mean substitution and analysis of the Box-plot to perform data cleaning on the data in the data set $[\Delta u, \Delta y]$, and filling missing data and eliminating outlier data in the data set obtained by collection;

The steps of adopting the LSSVM algorithm to design the turbofan engine controller in step 3 are as follows, and the structural block diagram thereof is shown in FIG. 2:

Step 3.1: for the training data obtained in step 1.2, adopting the random sampling method to use 80% of the total data as training data and 20% as testing data;

Step 3.2: adopting the Gauss kernel function $\Omega=K(p,t,k)$ to map the training data set to a high-dimensional feature space with the dimension of z from the original space so as to realize the linear regression of the training data set in the z-dimensional feature space, which is expressed as follows:

$$\Omega = K(p, t, k) = \exp\left(-\frac{\|p(t)-p(k)\|_2^2}{2\sigma^2}\right)$$

wherein p is the scheduling parameter in the linear variable parameter model, t and k respectively represent the time t and the time k, p(t) and p(k) represent the scheduling parameters of the time t and the time k, $\sigma$ is the radial basis width (belonging to a hyper-parameter) of the Gauss kernel function, and $\sigma>0$ is required;

Step 3.3: establishing the optimization problem:

$$\min_{\omega,b,e} J(\omega, e) = \frac{1}{2}\omega^T\omega + \frac{1}{2}\gamma\sum_{i=1}^{N}e_i^2$$

$$\text{s.t. } y_i[\omega^T\varphi(x_i) + b] = 1 - e_i$$

wherein $\omega$ is the normal vector of a hyperplane, the hyper-parameter $\gamma$ is the weight for balancing "computation power for finding an optimal hyperplane" and "minimum deviation between training set and testing set", and $\gamma>\zeta$ is required, wherein $\zeta$ is a smaller number (with the dimension equal to 1) not less than 0, $y_i$ is the dependent variable after the control signals are given, e is the training error, b is the bias operator, and N is the number of samples in the training data set;

Step 3.4: using the Gaussian kernel function in step 3.2 and solving the optimization problem in step 3.3 to obtain the LSSVM regression function, which is expressed as follows:

$$y_{lssvm} = \sum_{k=1}^{N}\alpha_k K(p, t, k) + b$$

wherein $y_{lssvm}$ is the output of the turbofan engine controller designed based on the LSSVM algorithm, a is the Lagrangian operator used during the solving process, and N is the number of data samples for training;

As shown in FIG. 3, in step 4, using the adaptive boosting method and the output of the turbofan engine controller designed based on the LSSVM algorithm established in step 3 to construct an adaptive boosting algorithm-based turbofan engine direct data-driven controller, and adjusting the parameters of the controller;

Step 4.1: inputting the training sample $T=[\Delta u', \Delta y']$, wherein $[\Delta u', \Delta y']$ is the turbofan engine control data set obtained after data cleaning, wherein $\Delta u'$ is a control signal, $\Delta y'$ is the measured value $\Delta n_{2cor}$ of high-pressure rotor variation, and the basic learners in the adaptive boosting algorithm adopt the turbofan engine controller designed based on the LSSVM algorithm constructed in step 3 to give the initial hyper-parameter radial basis width σ and the weight γ and set epoch as the iteration number of the basic learners;

Initially setting σ=30 and γ=10, and setting the iteration number epoch=10 of the basic learners;

Step 4.2: initializing the weight of the training set to $D(1)=(w_{11}, w_{12}, \ldots, w_{1N})$, $$w_{1i} = \frac{1}{N},$$

i=1, 2, ..., N, where w is the weight of each data sample;

Step 4.3: for the iteration number k=1, 2, ..., epoch, using the training data set of the weight D(k) for training to obtain the basic learner $G_{k(x)}$, and calculating the maximum error $E_k$ predicted by the basic learner on the training data set, which is expressed as follows:

$$E_k = \max |y_i - G_{k(x_i)}|, i=1,2,\ldots,N$$

Step 4.4: calculating the relative error of each data sample in the training data set, and generally adopting a linear error, a square error and an exponential error (selecting one in use), which are respectively expressed as follows:

$$\text{Linear error}: e_{ki} = \frac{|y_i - G_{k(x_i)}|}{E_k}$$

$$\text{Square error}: e_{ki} = \frac{(y_i - G_{k(x_i)})^2}{E_k^2}$$

$$\text{Exponential error}: e_{ki} = 1 - \exp\left(-\frac{y_i - G_{k(x_i)}}{E_k}\right);$$

Step 4.5: calculating the regression error rate $e_{regression}$, as shown in the following formula:

$$e_{regression} = \sum_{i-1}^{N} w_{ki} e_{ki}$$

wherein $w_{ki}$ is the weight of the data sample in the training data set obtained from the last iteration, and $e_{ki}$ is the relative error obtained in step 4.4;

Step 4.6: calculating the weight coefficient $weight_k$ of the basic learner, as shown in the following formula:

$$weight_k = \frac{e_{regression}}{1 - e_{regression}}$$

Step 4.7: updating the sample weight distribution of the training data set, and adaptively adjusting the hyper-parameter σ according to the regression error rate, which is expressed as follows:

$$w_{k+1,i} = \frac{w_{ki}}{Z_k} weight_k^{1-e_{ki}}$$

$$\sigma_k = \sigma_{k-1} - 0.8 * \exp(-(weight_k - weight_{k-1}))$$

wherein $w_{ki}$ is the weight coefficient of the $i^{th}$ data sample at the $k^{th}$ iteration, $\sigma_k$ is the hyper-parameter σ at the $k^{th}$ iteration, and $Z_k \Sigma_{i-1}^N w_{ki} \cdot weight_k^{1-e_{ki}}$ is the normalized operator.

Step 4.8: averaging the predictive values $y_c$ generated by all iterations to obtain the final strong learner output $y_{final}$, which is expressed as follows:

$$y_{final} = \frac{1}{epoch} \sum_{c=1}^{epoch} y_c$$

Step 5: using the cross validation method to determine the initial hyper-parameter radial basis width σ and the weight γ to satisfy the validation error of less than 0.1%, maintaining the condition of σ,γ>ζ at all times during the iteration, wherein ζ is a smaller number not less than 0, if not in line, discarding the initial value, and selecting a larger radial basis width σ as the initial value of iteration to complete the design of the adaptive boosting algorithm-based turbofan engine direct data-driven controller.

Figure 5:
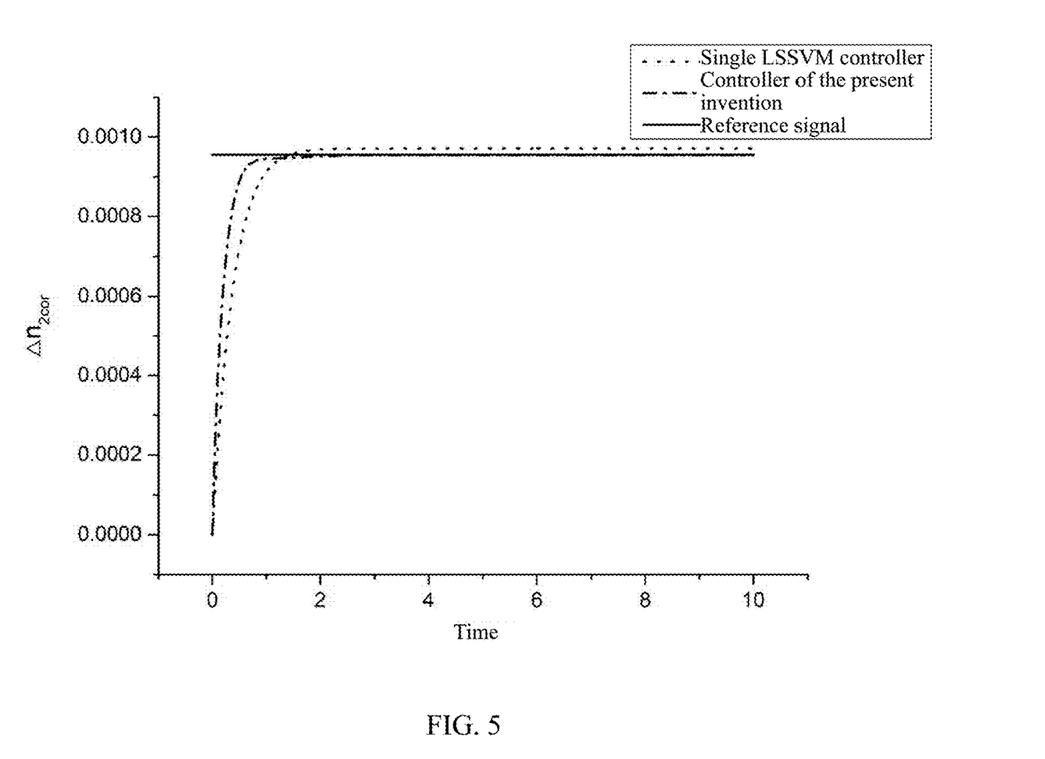
FIG. 5 is a comparison diagram of control results obtained based on a single LSSVM controller and an adaptive boosting algorithm-based turbofan engine direct data-driven controller of the present invention under the working conditions of $\Delta n_{2cor}=88\%$ and $\Delta w_f=100$.
Figure 6A:
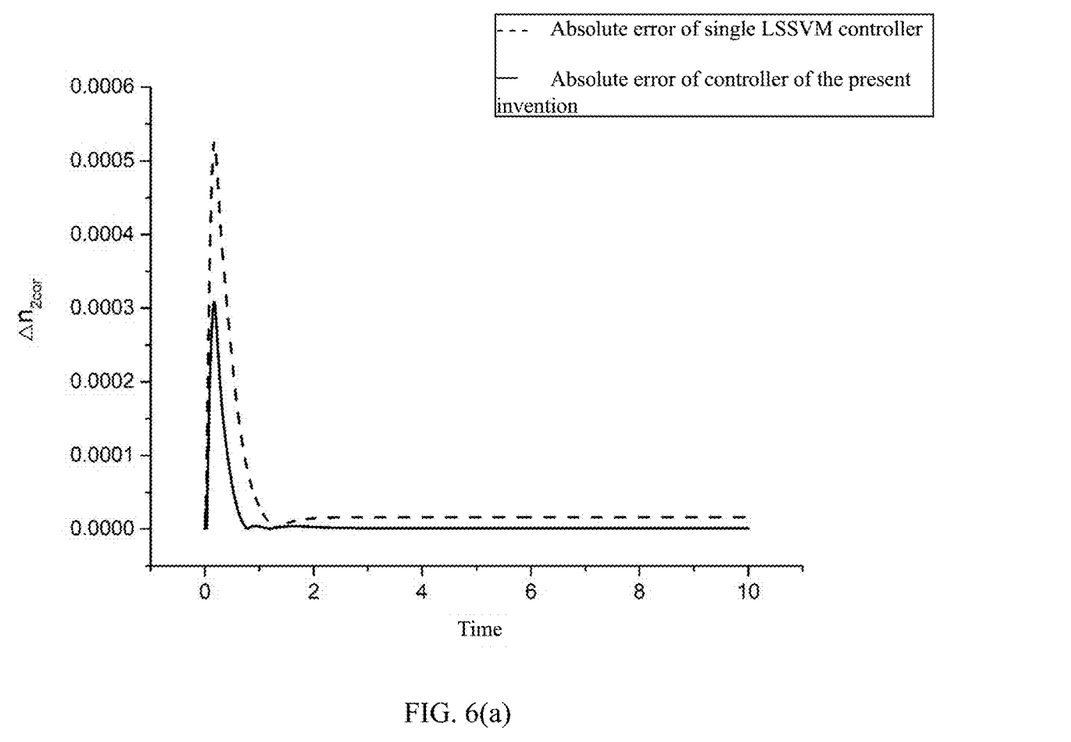
FIG. 6(a) and FIG. 6(b) are respectively comparison diagrams of control absolute errors and relative errors obtained based on a single LSSVM controller and an adaptive boosting algorithm-based turbofan engine direct data-driven controller of the present invention under the working conditions of $\Delta n_{2cor}=88\%$ and $\Delta w_f=100$.
Figure 6B:
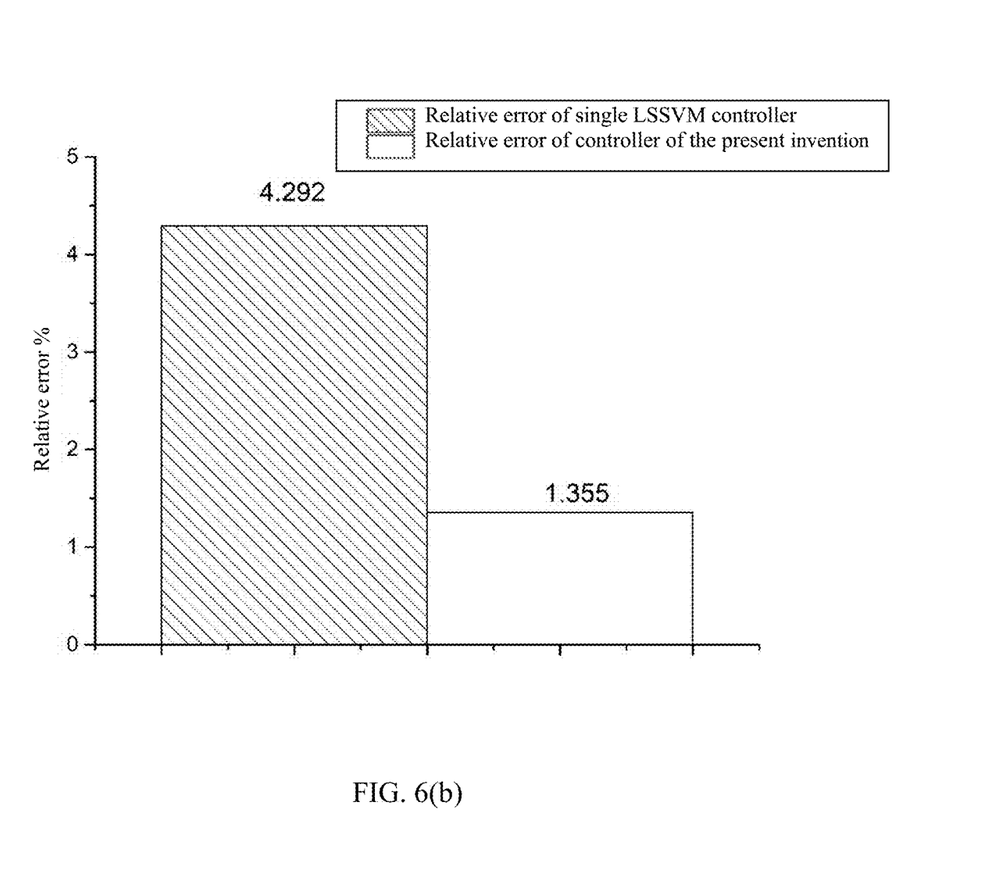

FIG. 5 is a comparison diagram of control results of a high-pressure rotor obtained based on a single LSSVM controller and an adaptive boosting algorithm-based turbofan engine direct data-driven controller of the present invention under the working conditions of $\Delta n_{2cor}$=88% and $\Delta w_f$=100, from which it can be seen that the controller of the invention shortens the response time and reduces overshoot FIG. 6(a) and FIG. 6(b) are respectively comparison diagrams of control absolute errors and relative errors of a high-pressure rotor obtained based on a single LSSVM controller and an adaptive boosting algorithm-based turbofan engine direct data-driven controller of the present invention under the working conditions of $\Delta n_{2cor}$=88% and $\Delta w_f$=100. When the turbofan engine reaches a steady operating state, compared with the original method, the improvement method adopted reduces the absolute error by 95.8% and reduces the average relative error by 3.29% within the entire working time.

In conclusion, the turbofan engine direct data-driven controller using the adaptive boosting algorithm can shorten the time for the turbofan engine to reach the target rotary speed, and significantly reduce the control error and improve the control precision, with obvious performance advantages.

The invention claimed is:

1. An adaptive boosting algorithm-based turbofan engine direct data-driven control method, wherein the method comprises the following steps:
    step 1: establishing a data set for the design of a turbofan engine direct data-driven controller
    step 1.1: collecting control signals during the operation of the turbofan engine, including input fuel flow $w_f(n)$ of turbofan engine, corrected relative rotary speed $n_{1cor}(n)$ of low-pressure rotor, and corrected relative rotary speed $n_{2cor}(n)$ of high-pressure rotor, wherein n=1, 2, ..., indicating the $n^{th}$ sampling period;
    step 1.2: Δu represents the input of turbofan engine, Δy represents the output of turbofan engine, $\Delta n_{1cor}(n)$ and $\Delta n_{2cor}(n)$ respectively represent the variations of corrected relative rotary speeds of low-pressure rotor and high-pressure rotor of the turbofan engine, and $\Delta w_f(n)$ represents the variation of the input fuel flow of turbofan engine, defining $$\Delta u = [\Delta w_f(1), \Delta w_f(2), \ldots, \Delta w_f(n)]^T$$

$$\Delta y = [\Delta n_{2cor}(1), \Delta n_{2cor}(2), \ldots, \Delta n_{2cor}(n)]^T$$

[Δu,Δy] is the original data set for the design of the turbofan engine direct data-driven controller;
    step 1.3: using the corrected relative rotary speed $n_{2cor}$ of high-pressure rotor as a scheduling parameter p (with the dimension equal to 1), and converting the scheduling parameter p to be within [−1,1], as shown in the following formula:

$$p = \frac{2n_{2cor} - (n_{2cor\_max} + n_{2cor\_min})}{(n_{2cor\_max} - n_{2cor\_min})}$$

wherein $n_{2cor\_max}$ and $n_{2cor\_min}$ are respectively the upper limit and lower limit of the relative rotary speed $n_{2cor}$ of high-pressure rotor of the turbofan engine;

step 2: adopting the methods of mean substitution and analysis of the Box-plot to perform data cleaning on the data in the data set [Δu,Δy], and filling missing data and eliminating outlier data in the data set;

step 3: adopting the LSSVM algorithm to design the turbofan engine controller step 3.1: adopting the random sampling method to use 80% of the data set as a training data set and 20% as a testing data set;

step 3.2: adopting the Gauss kernel function Ω=K(p,t,k) to map the training data set to a high-dimensional feature space with the dimension of z from the original space so as to realize the linear regression of the training data set in the z-dimensional feature space, wherein the kernel function is expressed as follows:

$$\Omega = K(p, t, k) = \exp\left(-\frac{\|p(t) - p(k)\|_2^2}{2\sigma^2}\right).$$

wherein t and k respectively represent the time t and the time k, p(t) and p(k) represent the scheduling parameters of the time t and the time k, σ is the initial hyper-parameter radial basis width of the Gauss kernel function, and σ>0 is required;

step 3.3: establishing the optimization problem of LSSVM:

$$\min_{\omega,b,e} J(\omega, e) = \frac{1}{2}\omega^T\omega + \frac{1}{2}\gamma\sum_{i=1}^{N} e_i^2$$

$$s.t. y_i[\omega^T\varphi(x_i) + b] = 1 - e_i$$

wherein ω is the normal vector of a hyperplane, the hyper-parameter γ is the weight for balancing "computation power for finding an optimal hyperplane" and "minimum deviation between training set and testing set", $y_i$ is the dependent variable after the control signals are given, e is the training error, b is the bias operator, and N is the number of samples in the training data set;

step 3.4: using the Gaussian kernel function in step 3.2 and solving the optimization problem in step 3.3 to obtain the LSSVM regression function, which is expressed as follows:

$$y_{lssvm} = \sum_{k=1}^{N} \alpha_k K(p, t, k) + b$$

wherein $y_{lssvm}$ is the output of the turbofan engine controller designed based on the LSSVM algorithm, a is the Lagrangian operator, b is the bias operator, and N is the number of samples in the training data set;

step 4: using the adaptive boosting method and the output of the turbofan engine controller designed based on the LSSVM algorithm established in step 3 to construct an adaptive boosting algorithm-based turbofan engine direct data-driven controller, and adjusting the parameters of the controller step 4.1: the training data set is T=[Δu',Δy'], and [Δu',Δy'] is the turbofan engine control data set obtained after data cleaning, wherein Δu' is a control signal, Δy' is the measured value $\Delta n_{2cor}$ of high-pressure rotor variation, and the basic learners in the adaptive boosting algorithm adopt the turbofan engine controller designed based on the LSSVM algorithm constructed in step 3 to give the initial hyper-parameter radial basis width σ and the weight γ and set epoch as the iteration number of the basic learners;

step 4.2: initializing the weight of the training data set to D(1)=(w$_{11}$, w$_{12}$, . . . , w$_{1N}$), $$w_{1i} = \frac{1}{N},$$

i=1, 2, . . . , N, where w is the weight of each sample in the training data set;

step 4.3: for the iteration number k=1, 2, . . . , epoch, using the training data set of the weight D(k) for training to obtain the basic learner $G_{k(x)}$, and calculating the maximum error $E_k$ predicted by the basic learner on the training data set, which is expressed as follows:

$$E_k = \max|y_i - G_{k(x_i)}|, i=1,2,\ldots,N$$

step 4.4: calculating the relative error of each data sample in the training data set, and adopting a linear error, a square error or an exponential error, which are respectively expressed as follows:

$$\text{linear error}: e_{ki} = \frac{|y_i - G_{k(x_i)}|}{E_k};$$

$$\text{square error}: e_{ki} = \frac{(y_i - G_{k(x_i)})^2}{E_k^2};$$

$$\text{exponential error}: e_{ki} = 1 - \exp\left(-\frac{y_i - G_{k(x_i)}}{E_k}\right);$$

step 4.5: calculating the regression error rate $e_{regression}$, as shown in the following formula:

$$e_{regression} = \sum_{i=1}^{N} w_{ki} e_{ki}$$

wherein $w_{ki}$ is the weight of the data sample in the training data set obtained from the last iteration, and $e_{ki}$ is the relative error obtained in step 4.4;

step 4.6: calculating the weight coefficient weight$_k$ of the basic learner, as shown in the following formula:

$$\text{weight}_k = \frac{e_{regression}}{1 - e_{regression}}$$

step 4.7: updating the sample weight distribution of the training data set, and adaptively adjusting the initial hyper-parameter radial basis width σ according to the regression error rate, which is expressed as follows:

$$w_{k+1,i} = \frac{w_{ki}}{Z_k} \text{weight}_k^{1-e_{ki}}$$

$$\sigma_k = \sigma_{k-1} - 0.8 * \exp(-(\text{weight}_k - \text{weight}_{k-1}))$$

wherein $w_{ki}$ is the weight coefficient of the $i^{th}$ data sample at the $k^{th}$ iteration, $\sigma_k$ is the hyper-parameter $\sigma$ at the $k^{th}$ iteration, and $Z_k = \sum_{i=1}^{N} w_{ki} \cdot \text{weight}_k^{1-e_{ki}}$ is the normalized operator;

step 4.8: averaging the predictive values $y_c$ generated by all iterations to obtain the final strong learner output $y_{final}$, which is expressed as follows:

$$y_{final} = \frac{1}{epoch} \sum_{c=1}^{epoch} y_c$$

step 5: using the cross validation method to determine the initial hyper-parameter radial basis width $\sigma$ and the weight $\gamma$ to satisfy the validation error of less than 0.1%, and maintaining the condition of $\sigma, \gamma > \zeta$ at all times during the iteration, wherein $\zeta$ is a smaller number not less than 0, if not in line, discarding the initial value, and selecting larger radial basis width $\sigma$ and weight $\gamma$ as the initial values of iteration to complete the design of the adaptive boosting algorithm-based turbofan engine direct data-driven controller.

* * * * *